United States Patent [19]

Curti

[11] Patent Number: 5,015,826
[45] Date of Patent: May 14, 1991

[54] POWER ADJUSTMENT DEVICE FOR ELECTRIC POWER SYSTEMS, IN PARTICULAR FOR ELECTRIC POWER SYSTEMS WITH ELECTRIC OVENS

[75] Inventor: Pietro Curti, Lodivecchio, Italy

[73] Assignee: Curti S.n.c. di Curti Pietro & C., Lodivecchio, Italy

[21] Appl. No.: 354,179

[22] Filed: May 17, 1989

[30] Foreign Application Priority Data

May 27, 1988 [IT]  Italy ................. 20791 A/88

[51] Int. Cl.⁵ .................................. H05B 1/02
[52] U.S. Cl. ........................ 219/492; 219/508; 219/506; 219/483; 219/486; 307/41; 307/39
[58] Field of Search .................. 219/483–486, 219/497, 501, 492, 494, 400, 413, 508, 506; 307/38–41, 117; 323/319, 320

[56] References Cited

U.S. PATENT DOCUMENTS

| | | | |
|---|---|---|---|
| 4,362,949 | 12/1982 | McKenney et al. | 219/486 |
| 4,520,274 | 5/1985 | Stants | 307/41 |
| 4,583,182 | 4/1986 | Breddan | 307/39 |
| 4,656,835 | 4/1987 | Kidder et al. | 307/39 |
| 4,695,738 | 9/1987 | Wilmot | 307/39 |
| 4,829,159 | 5/1989 | Braun et al. | 307/41 |

Primary Examiner—M. H. Paschall
Attorney, Agent, or Firm—Guido Modiano; Albert Josif

[57] ABSTRACT

This power adjustment device for electric power systems, in particular for electric power systems with electric ovens, has the aim of optimizing the electric absorption of the system by reorganizing the power requests of the various users comprised in the system. The device comprises elements for detecting the power requests of a plurality of users, a control and management unit adapted to check if the available power is sufficient to feed the requesting users and to enable and disable selectively some of the users operating at that moment according to the available power and according to criteria of priority or of elapsed operating time.

21 Claims, 3 Drawing Sheets

5,015,826

POWER ADJUSTMENT DEVICE FOR ELECTRIC POWER SYSTEMS, IN PARTICULAR FOR ELECTRIC POWER SYSTEMS WITH ELECTRIC OVENS

BACKGROUND OF THE INVENTION

The present invention relates to a power adjustment device for electric power systems, in particular for electric power systems with electric ovens.

As is known, in industrial systems comprising a plurality of electric users each whereof has its own connection times and durations, the power demands of the different users may give rise to periods of absorption equal to the maximum installed power, followed randomly by periods of low or even zero absorption, in particular when the connection and disconnection of the users are not correlated to one another.

This behaviour is disadvantageous, as it requires on one hand the availability of high power levels even when the power is not actually used, as occurs most of the time, and on the other hand it entails a penalization in terms of the costs related to the maximum available power.

The uncontrolled satisfaction of the power demands furthermore does not allow a rational management of the system.

SUMMARY OF THE INVENTION

The aim of the present invention is consequently to provide a power adjustment device for electric power systems, in particular for electric power systems with electric ovens, capable of solving the disadvantages of the known art, and in particular of optimizing the electric absorption of the system by reorganizing the power demands so as to eliminate, or at least reduce, the sequences of alternately maximum and zero absorption.

Within the scope of this aim, an object of the present invention is to provide a device capable of ensuring a constant absorption which is proximate to the average utilization value, without exceeding a preset threshold, therefore allowing the user to save on the fixed rate related to the available power.

Another object of the present invention is to provide a device which is capable of providing energy savings.

A further object of the present invention is to provide a device which is extremely flexible and adaptable to the system to be controlled and is easily modifiable to control any further users introduced into the system.

Not least object of the present invention is to provide a device which is capable of providing maximum reliability and safety, is easily applicable to existing systems and requires no particular knowledge and preparation for its use, as it entails the execution of very simple operations by its operator.

The above described aim, the objects mentioned and others which will become apparent hereinafter are achieved by a power adjustment device for electric power systems, in particular for electric power systems with electric ovens, as defined in the accompanying claims.

In particular, the power adjustment device according to the invention is based on the acknowledgement that the average power consumption of a system, e.g. an oven, in normal operating conditions is a fraction (e.g. 40%) of the maximum power, and that the operation of the system generally has very short power demand cycles. It is consequently possible to set a top power limit, close to the average used power level, and detect, store and redistribute the various random power demands, taking into account the preset power limit, so as to shift by only a few seconds the delivery of power without altering the thermal balance of the system but with considerable savings in the costs related to the available power.

BRIEF DESCRIPTION OF THE DRAWINGS

Further characteristics and advantages of the invention will become apparent from the description of a preferred but not exclusive embodiment, illustrated only by way of non-limitative example in the accompanying drawings in the case of an electric bread-baking oven. In particular.

DESCRIPTION OF THE PREFERRED EMBODIMENTS

Figure 1:
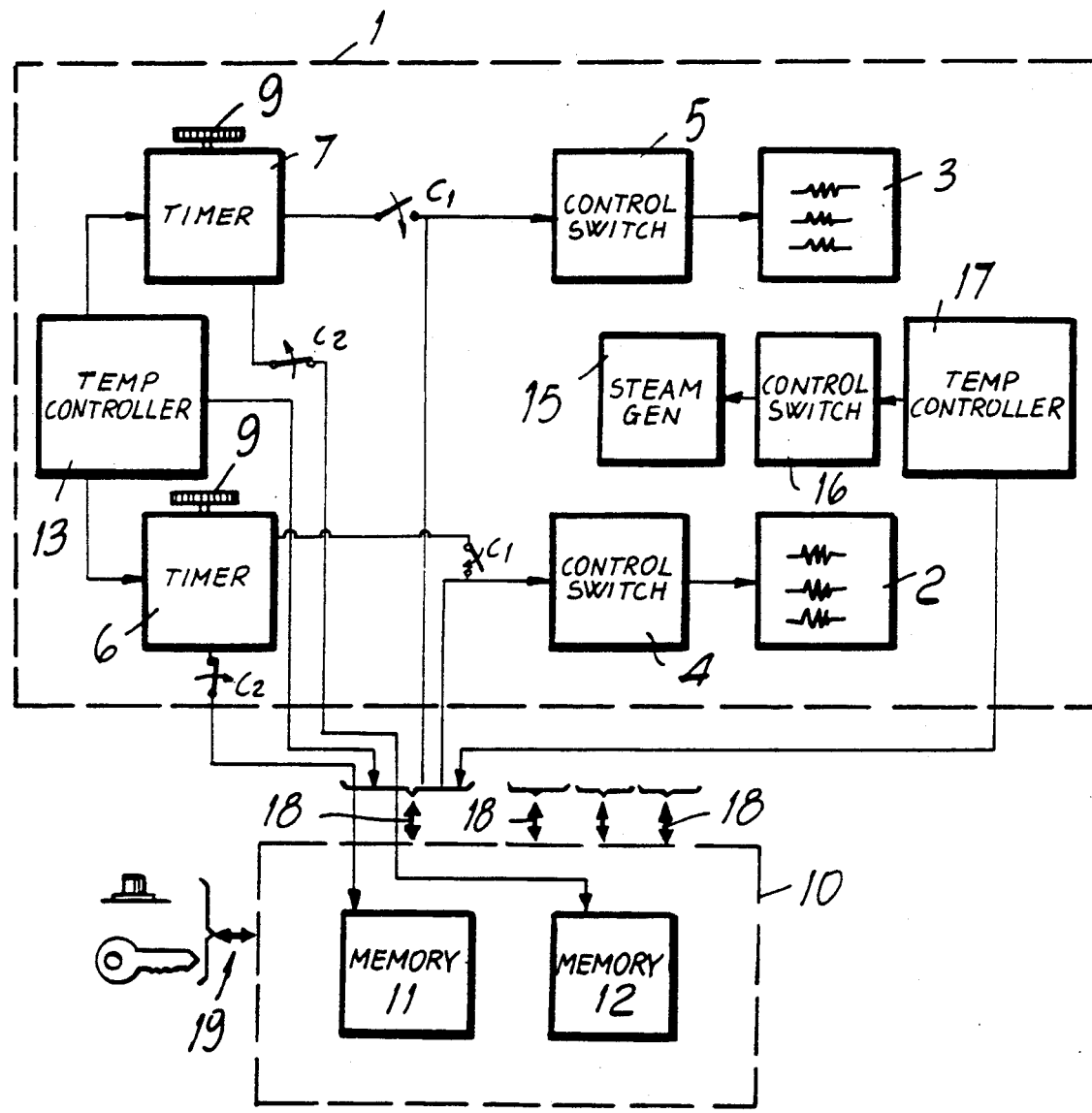
FIG. 1 is a general diagram of the oven equipped with the device according to the invention.

Reference should initially be made to FIG. 1, illustrating the general diagram of the oven equipped with the adjustment device according to the invention.

In its general structure, the oven is constituted by a plurality of cooking chambers, of which only one is illustrated in the figures and is indicated by the reference numeral 1. Each cooking chamber has two distinct heating sectors, respectively in the lower part of the chamber (corresponding to the cooking level) and in its upper part, each comprising a battery or bank of resistors, respectively 2 and 3.

Each battery of resistors (hereafter referred to as a user is controlled by a respective remote control switch 4, 5 which is in turn controlled by a timer 6, 7 (with closed switch $C_1$=unregulated operation) or by a control and management unit 10 (with open switch $C_1$=adjusted operation according to the invention). Said timer which has the function of generating operating impulses, is connected to the control and management unit 10 which ensures the distribution of power to all the users in the different chambers according to the request and to the available power, as will become apparent hereinafter. Points $C_1$ (which are open during normal operation, controlled by unit 10) and $C_2$ (which are closed during normal operation) are switching points allowing the connection and disconnection of the various elements, depending on the system being operating with or without the control unit as already mentioned. The points $C_1$ and $C_2$ can be made, differently from what has been described and without thereby requiring switches, for example, by means of manually connectable and disconnectable bridges or deviators. Each pair of timers 6 and 7 (connected to a memory 11 resp. 12 which is internal to the control unit 10 and may be implemented e.g. by an up and down counter), is controlled by a temperature controller 13 arranged in an intermediate region of the chamber and provided with a thermometer to control the temperature in the chamber. The temperature controller 13, which is a single one for both batteries of resistors, generates a continuous signal which is fed to the timers 6, 7 which transform it into intermittent activations which are variable according to the position of a knob 9 provided on said timers according to the requirements of the user. In particular the knob allows to adjust the connection time of the resistors, therefore the average power of that specific battery of resistors which is required by the user for his own requirements, from a minimum of 20% up to stable connection, corresponding to 100%, so as to obtain in any case minimum active and disconnection times of the remote control switches not lower than 7–10 seconds.

Each chamber has a steam generator 15 controlled by its own remote control switch 16 which is in turn controlled by a thermostat 17 which is also connected to the control unit 10. In this case, however, the adjustment of the steam generator is completely assigned to its respective temperature controller (or thermostat), and the connection to the control unit merely has the function of notifying said control unit of the switch-on and switch-off times of the generator, since its operation, being prioritized, determines the cutoff of any power exceeding the preset load according to the operating cycle preset for that instant as will be explained hereinafter.

The control unit 10 is also connected, (arrows 18) to the other chambers of the oven to exchange the information required for their operation, as illustrated in the figure for chamber 1 and as will become apparent hereinafter. The control unit 10 typically comprises a microprocessor (e.g. NEC 78C10) with data and program memories (including memories 11, 12), a display controlled by an own microprocessor and a keyboard for operator dialogue, as well as a watchdog circuit to check the correct operation of the device, in a per se known manner which is therefore not illustrated. The unit 10 finally has further inputs, schematically indicated at 19 in the figure and connected to setup pushbuttons and to a key to allow programming of some parameters. In particular, according to the present embodiment, the following parameters may be set: nominal power of the resistors and of the steam generator for each individual chamber; top power limit (power not to be exceeded during the operation of the adjustment device; top power limit may be modified by an external signal which indicates the absorption of power of all other devices not directly connected to the embodiment but included in the electrical system to be controlled); extra power (top power limit replacing the preceding one, which can be set by the operator in particular instances); cycle time (cycle time of each user - two for each chamber -); alarm delay time (time after which the control unit warns the user that the set top power limit is insufficient for the correct operation of all the chambers); priority (allows to select two types of operation, with and without priority; in the first case the connection of the chambers is performed according to the order of demands, in the second the demands of the chambers having higher priorities are privileged); and priority order. The adjustment device according to the illustrated embodiment furthermore allows to select two different types of startup, i.e. slow startup, in which the users are switched on according to the demand, and quick startup, in which the adjustment device switches on all the batteries it is able to in compliance with the power limit, distributing the available power equally among the switched-on chambers. The alarm indicating insufficient power is disabled during startup and until the preset temperature is reached in all the chambers.

During normal operation the adjustment device according to the invention controls the connection and disconnection of the individual users according to the reading of the inputs and in compliance with the value of the programmed parameters as listed above. In this step the display indicates the correct operational status of the system, the values of the nominal power absorbed by the oven and the top power limit. If during this step the top power limit is such as not to allow the unit to feed all the switched-on users within the alarm delay time, the display indicates this condition so that the operator can provide the appropriate remedy or remedies.

The operation of the illustrated embodiment of the adjustment device according to the invention is now described with reference to FIGS. 2, 2a and 3.

Figures 2, 2A:
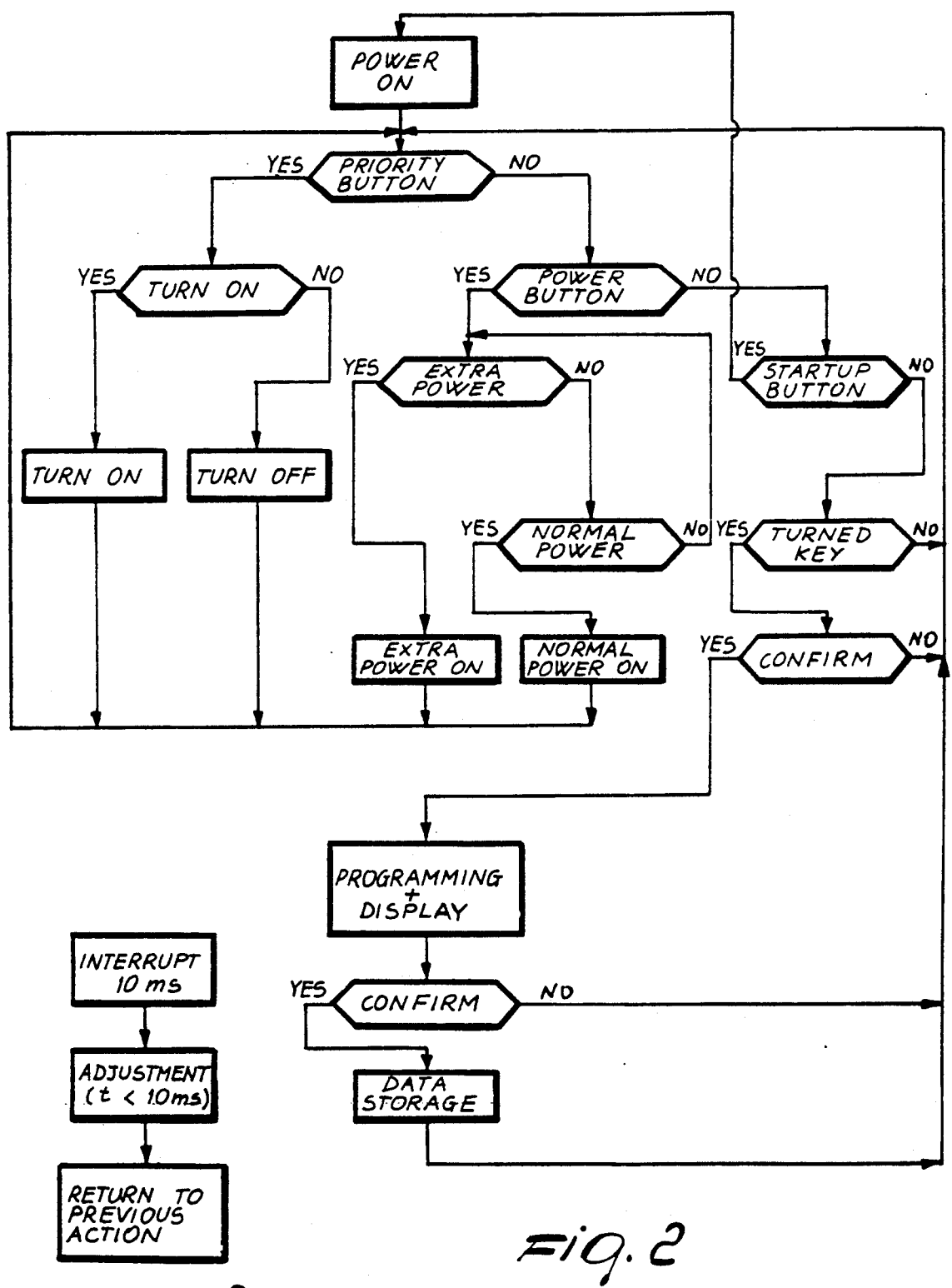
FIGS. 2, 2a and 3 are block diagrams of the power adjustment process obtainable with the adjustment device according to the invention.

Reference should thus be made first to FIG. 2. Initially, when the device is activated or when a specifically provided startup push button is pressed, the microprocessor initialization procedure is started to preset the inputs and the outputs and to program the display (block POWER ON). At the end of this step the program enters a step in which it waits for keyboard commands to program the power and to enable or disable priority operation, and also checks if the key which allows the user to access the programming step is inserted. In detail, after initialization, the device checks if the priority change push-button has been pressed and if this is true the device asks whether the priority operation is to be enabled or disabled and then performs the requested change. If the priority button has not been activated, the device checks if the top power limit change button has been pressed. If it has, then it asks whether normal power or extra power is to be enabled and it acquires the supplied data from keyboard. If the power button has not been activated, it checks if the startup button has been activated and, if it has, it reruns the initialization procedure; if even the startup button has not been activated, then it checks if the key has been turned and if it has it enters the programming step, in which the operator can modify the presettable parameters. Then all the preset parameters are displayed, confirmation of the data is requested and said data are then stored. Then the sequence returns to its initial point.

During the execution of the sequence shown in FIG. 2, an interrupt is generated for carrying out power adjustment according to the present invention, as schematically shown in FIG. 2a. In particular, in the instant embodiment, the interrupt, which is not enabled only during the programming step, is automatically generated by the processor every 10 ms synchronously with respect to the microprocessor clock but fully independently from the operations performed with the buttons.

Figure 3:
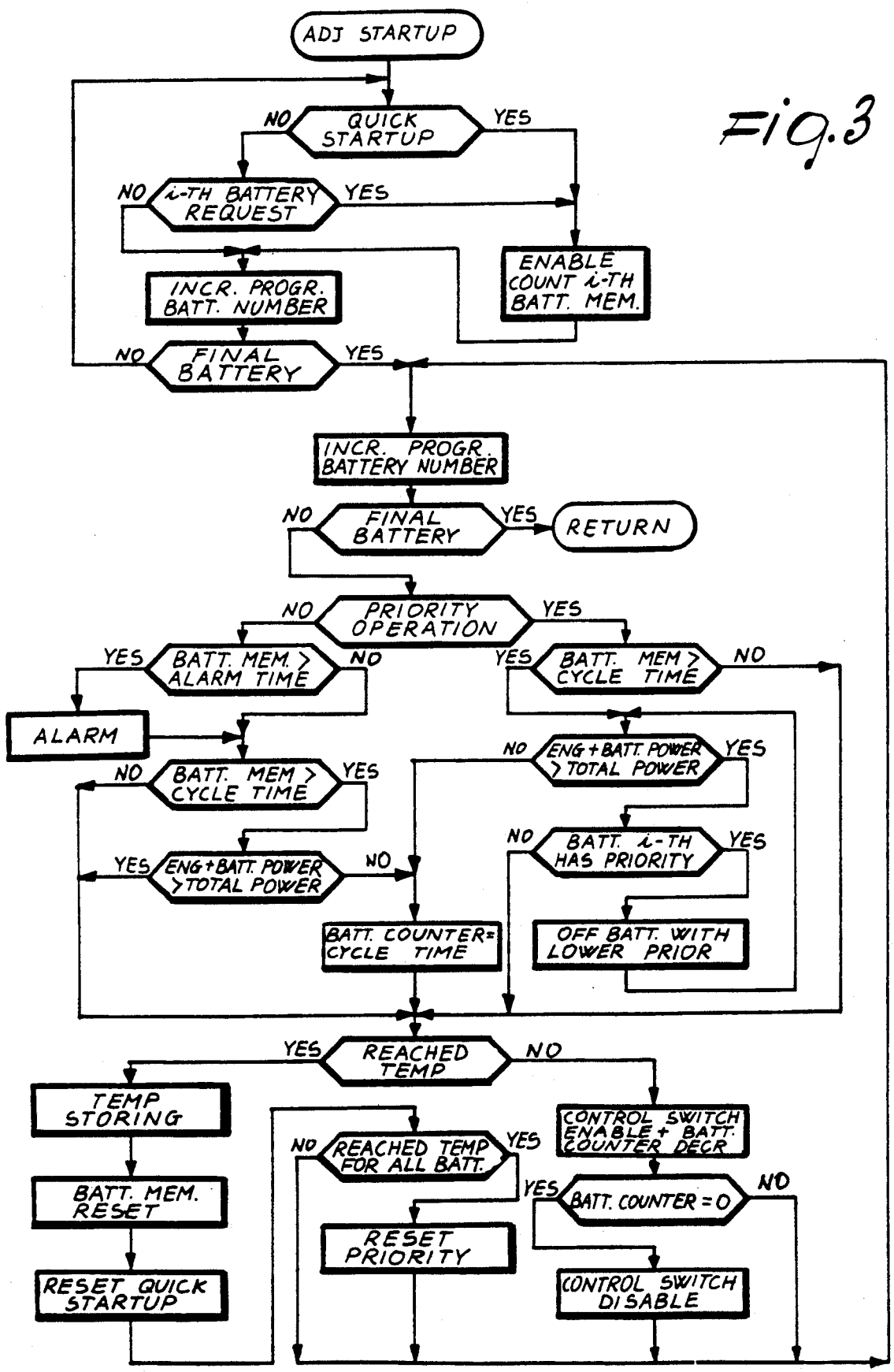

The actual adjustment program, symbolized in FIG. 2a by block ADJUSTMENT and illustrated in the block diagram of FIG. 3, therefore runs every 10 ms and may be executed at any point of diagram of FIG. 2, except as said, during the programming step.

Reference should now be made to the diagram of FIG. 3, which illustrates, as mentioned, the adjustment program. At the beginning of the adjustment program the device verifies the condition of slow-startup or quick-startup operation. If the operator presets quick startup, the unit 10 increments all the users memories (hereinafter also simply termed memories) regardless of the position of the knob on the timer. In the case of slow startup the program individually scans the various inputs to check if they have submitted a request for power, and when it verifies a request it enables the memory of said battery so that it begins to increment up to the value required by the timer. At the end of this scanning of all the inputs the program starts a further scanning of all the memories to activate the related users according to the adjustment program.

In detail, for each memory the program asks if priority operation has been enabled. If it has not, it asks if the number stored in the memory is greater than the alarm time; if it is, it activates an acoustic or lightning and a display alarm and then asks if the memory is greater than the preset cycle time. If it is not, the program advances to check the reached temperature as described hereafter; if it has, the program checks if the already engaged power plus the power required by the user which is being checked at that instant exceeds the preset top power limit. If the power limit is exceeded, then the program again checks the reached battery temperatures; if the power limit is not exceeded, a second memory (hereafter named counter) of the checked battery is set equal to the cycle time supplied by the respective timer. Similarly, if priority operation is preset (the YES output of the block "PRIORITY OPERATION") the device checks if the memory has exceeded the cycle time. If it has not, the program goes to the successive memory; if it has, it checks if switching on of the user causes the total top power limit to be exceeded. If it does, the program checks if the user to be switched on has a higher priority than at least one of the users which is already on, and in this case the user with lowest priority is switched off and the total power is checked again. If the user to be switched on has a lower priority than the users already connected, the program checks the next memory. If instead after checking the power the limit is not exceeded, the memory currently being checked is set to the time supplied by the related timer, as in unprioritized operation. After this operation, regardless of the type of operation (prioritized or unprioritized) the control unit checks if the temperature controller of the chamber has sent a signal indicating that the required temperature has been reached. If it has not, the remote control switch of the user is enabled to turn on and the decrement of the controlled counter is enabled. Then the counter is checked, and if it has reached zero then turning on of the remote control switch is no longer enabled and the remote control switch is thus turned off. Then the program checks the next memory. When the chamber related to the user memory being checked has reached the temperature set by means of the temperature controller, and therefore the latter has sent the related signal indicating that the required temperature has been reached (the output of the block TEMPERATURE REACHED is YES), the program memorizes the reception of said signal, resets the memory of the two users corresponding to the chamber, resets the slow-startup operation (since by now an advanced adjustment stage has been reached) and checks if all the chambers have already reached the required temperature. If they have not, the program checks the next memory, otherwise priority operation (which is used only during the startup step to reach the preset temperatures but it is not used during normal temperature-maintaining operation) is reset and control is then returned to the push-button control loop (diagram of FIG. 2).

In practice the control unit 10, by means of the described program, cyclically checks all the users to verify the ignition demand and activate the increment of the related memories in the case of slow startup. After a time equal to the cycle time has elapsed, the control unit checks if the remaining available power is sufficient to operate the user, possibly by disconnecting one or more users according to their priority or operating time, and then the user ignition procedure is activated. When the chamber has reached the required temperature, the two related users are switched off. The continuous scanning of all the user memories every 10 ms ensures that the users are checked with a sufficient frequency and with a good redistribution of the available power, without exceeding the preset power limits. However, the various memories have a programmable alarm threshold which checks the still-loaded storage and ignition time, and if it exceeds a given value because, e.g. the related user can never be turned on it issues an alarm signal which is displayed so that the operator can intervene e.g. by turning off some not essential users or by setting a higher power limit value (extra power) or in another manner.

As can be seen from the above description, the invention fully achieves the intended objects. In fact the power adjustment device according to the invention allows to optimize the electric power absorption of the various users, distributing the available power according to the demand and priority or to the user connection time. In particular, by turning off and on the individual users according to the indicated criteria a substantially constant absorption is achieved which is close to the power consumption average, and the preset threshold is not exceeded. This is achieved by simply delaying for a few seconds the delivery of power, without altering the thermal balance of the system. However, by virtue of the invention it is possible to save on the fixed rate related to the available power. Furthermore, regarding the actual power absorption, though there should be no savings, except for a reduction in the losses on the line, it has been observed that there is an induced saving due to the greater attention requested from the operator when e.g. the power limit is exceeded, besides the fact that when the chambers reach the preset temperature the operating times still stored in the related user memories are unloaded and no longer recovered.

The device according to the invention is furthermore very easy to use, since it only requires the operator to enter the variable parameters (this entry being also executable only once permanently if there are no reasons to modify it) and it furthermore requires no complicated operations for its installation. The device can furthermore be easily modified if further controlled users are to be inserted or if some are to be excluded, as it is sufficient to change the number of users set in the program and perform the required connections for the inputs and outputs and to also replace the program so that it better suits the operating requirements of other machines. Finally, the adjustment device is reliable and requires no particular maintenance.

The invention thus conceived is susceptible to numerous modifications and variations, all of which are within the scope of the inventive concept.

It is possible to expand the field of control of the power regulation devices to cover all of the electrical plant in the laboratory, having an oven or an apparatus or a series of apparatuses to be regulated installed therein, by inserting a signal which informs the device of the power absorted by the apparatus in that moment while operating. In this way, the maximum programmed power will be that which is available at the meter and the device will assign to the oven the power that is left available by the other apparatuses during operation.

The device is not only advantageously for the utilizer, but also affords a major advantage for the power distribution agency by virtue of the fact that razionalization of the apparatuses permits the requirements of more utilizers with currently used power, thereby avoiding the need to construct new power stations.

Furthermore all the details may be replaced with other technically equivalent elements.

We claim:

1. A power adjustment device for electric power systems, in particular for electric power systems with electric ovens, comprising means for detecting power requests of a plurality of users, available power storing means, means for checking if available power is sufficient to feed requesting users, and means for selectively enabling some of said users which are previously disabled and disabling some of said users which are previously enabled according to the available power, said enabling and disabling means comprising means for evaluating remaining turn on time of already enabled users and for selectively disabling at least one of said already enabled users having a shorter remaining turn on time when the available power is not sufficient to feed the requesting users, wherein said enabling and disabling means further comprise means for evaluating priority of the requesting users and means to selectively disable at least one of previously enabled users having lower priority than the requesting users when the available power is not sufficient to feed the requesting users having higher priority, and wherein said device further comprises a temperature controller associated with at least one user for detecting existing temperature and issuing a corresponding turn on request for the associated user, said request being fed to said means for detecting power requests and to said available power checking means.

2. A device according to claim 1, comprising, for each user, a user memory connected to said enabling and disabling means, a timer connected to the user memory and to said enabling and disabling means, and actuator means, connectable between the timer and the user.

3. A device according to claim 2, wherein said means for detecting power requests are connected to said temperature controller thereby, when a said request is received, said power request detecting means enable the user memory associated with said temperature controller to increment said user memory up to a maximum value defining a cycle time, and wherein said enabling and disabling means comprise means for detecting the value counted by said user memory and for enabling said available power checking means if the value counted by said user memory is higher than a preset time defining an alarm limit for insufficient power.

4. A device according to claim 1, comprising means for detecting setting of prioritized or unprioritized operation and to selectively enable said priority evaluation means and said turn on evaluating means.

5. A device according to claim 2, wherein said enabling and disabling means furthermore comprise means for loading said user memory of the requesting user with said cycle time when said means for checking the available power verify that the power is sufficient.

6. A device according to claim 2, wherein said temperature controllers comprise means for sending a signal indicating that a set temperature has been reached and wherein said enabling and disabling means furthermore comprise means for enabling decrement of said user memories and transmission, by said memories, of actuation pulses to associated actuator elements if said signal indicating that the set temperature has been reached is not received.

7. A device according to claim 6, wherein said enabling and disabling means further comprise means for verifying a count value of said user memories and sending a disabling signal to said associated actuation elements when said count value drops to zero.

8. A device according to claim 6, wherein said enabling and disabling means furthermore comprise means for resetting said user memories if said signal indicating that the set temperature has been reached is received.

9. A device according to claim 1, comprising means for cyclically enabling said enabling and disabling means.

10. A device according to claim 2, comprising means for setting a quick-startup operation and loading all the user memories to the maximum value when the device is switched on.

11. A device according to claim 2, wherein said timers comprise programming means to set a maximum value which can be loaded by said user memories.

12. A process for adjusting the available power in electric power systems, in particular with electric ovens, comprising the steps of: detecting power requests of a plurality of users, checking if available power is sufficient to feed requesting users, and selectively enabling some of said users which are disabled and disabling some of said users which are enabled according to the available power, said step of enabling and disabling comprising the steps of evaluating a remaining turn on time of already enabled users and selectively disabling at least one of said already enabled users with lower remaining turn on time when the available power is not sufficient to feed the requesting users, wherein said process further comprises the steps of evaluating a priority of the requesting users and of selectively disabling at least one of previously enabled users having lower priority than the requesting users when the available power is not sufficient to feed the requesting users having higher priority, and further wherein said process comprises the steps of checking a reached temperature signal of at least one said user and issuing a corresponding turn on request for the associated user.

13. A process according to claim 12, wherein when one of said power requests is received, a user memory associated with the requesting user is enabled to increment up to a programmed value.

14. A process according to claim 13, wherein a value counted by said used memories is detected and if said value counted by said memories is greater than a preset cycle time, availability of power is controlled.

15. A process according to claim 12, wherein setting of prioritized or unprioritized operation is detected and, selectively, if prioritized operation is selected, priority of the requesting users is evaluated and at least one of previously enabled users having lower priority than the requesting users is selectively disabled when the available power is not sufficient to feed the requesting users having higher priority, and, if unprioritized operation is selected, remaining turn on time of already enabled users is evaluated and at least one of said already enabled users with lower remaining turn on time is selectively disabled when the available power is not sufficient to feed the requesting users.

16. A process according to claim 14, wherein said user batteries of the requesting users are loaded with said cycle time when the available power is sufficient.

17. A process according to claim 13, wherein, in the absence of said temperature signal, down-counting of the user memories and transmission of actuation impulses to actuator elements associated to the requesting users by said user memories are enabled.

18. A process according to claim 17, wherein a count value of the user memories is verified and a disabling signal is sent to the actuator elements when the count value becomes zero.

19. A process according to claim 17, wherein the user memories are reset if the reached temperature signal is received.

20. A process according to claim 12, wherein the power requests and the operating status of the plurality of users are cyclically checked.

21. A process according to claim 13, comprising a quick-startup operation including the step of loading all the user memories to the programmed value at system switching on.

* * * * *